US012803415B2

(12) United States Patent
A V et al.

(10) Patent No.: US 12,803,415 B2
(45) Date of Patent: Nov. 17, 2026

(54) METHOD AND SYSTEM FOR OPERATING MULTIPLE OUTPUT SWITCHING CONVERTERS COMPRISING PWM DUTY SPLIT CONTROLLER

(71) Applicant: SAMSUNG ELECTRONICS CO., LTD., Suwon-si (KR)

(72) Inventors: Hareesh A V, Bengaluru (IN); Pradipta Patra, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 88 days.

(21) Appl. No.: 18/619,690

(22) Filed: Mar. 28, 2024

(65) Prior Publication Data

US 2024/0333131 A1 Oct. 3, 2024

(30) Foreign Application Priority Data

Mar. 28, 2023 (IN) ............................. 202341022619
Mar. 14, 2024 (IN) ............................. 202341022619

(51) Int. Cl.

*H02M 1/32* (2007.01)
*H02M 1/00* (2006.01)
*H02M 3/158* (2006.01)

(52) U.S. Cl.

CPC ............. *H02M 1/009* (2021.05); *H02M 1/32* (2013.01); *H02M 3/158* (2013.01)

(58) Field of Classification Search

CPC ..... G05F 1/00; G05F 1/10; G05F 1/12; G05F 1/46; G05F 1/455; G05F 1/45;

(Continued)

(56) References Cited

U.S. PATENT DOCUMENTS 6,839,247 B1 1/2005 Yang et al.
7,432,614 B2 10/2008 Ma et al.

(Continued)

FOREIGN PATENT DOCUMENTS

CN 104467423 A 3/2015
CN 107769552 A 3/2018

(Continued)

OTHER PUBLICATIONS

Hanh-Phuc Le et al., "A Single-Inductor Switching DC-DC Converter With Five Outputs and Ordered Power-Distributive Control", IEEE Journal of Solid-State Circuits, vol. 42, No. 12, Dec. 2007, pp. 2706-2714, DOI: 10.1109/JSSC.2007.908767.

(Continued)

*Primary Examiner* — Crystal L Hammond
*Assistant Examiner* — Nusrat Quddus
(74) *Attorney, Agent, or Firm* — Sughrue Mion, PLLC

(57) ABSTRACT

A method for operating multiple output switching converters includes determining, by a pulse width modulation (PWM) duty split controller, a plurality of balanced reference signals including a first balanced reference signal and a second balanced reference signal, generating, by the PWM duty split controller, based on the plurality of balanced reference signals, a third balanced reference signal, the generating of the third balanced reference signal including limiting, using a limiter, the first balanced reference signal and the second balanced reference signal and accumulating the limited first balanced reference signal and the limited second balanced reference signal, using an accumulator, and operating, by the PWM duty split controller, a first switch and a plurality of second switches associated with the multiple output switching converters, based on the plurality of balanced reference signals, the third balanced reference signal, and one or more circuit parameters.

18 Claims, 9 Drawing Sheets

(58) Field of Classification Search

CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; H02J 3/46; H02J 3/38

See application file for complete search history.

(56) References Cited

U.S. PATENT DOCUMENTS 7,723,965 B2 * 5/2010 Lesso .................... H02M 3/158 323/225
7,880,522 B2 2/2011 Ouyang et al.
8,049,472 B2 * 11/2011 Easwaran ............. H02M 3/158 323/283
8,581,562 B2 11/2013 Chen et al.
8,624,429 B2 * 1/2014 Jing ...................... H02M 3/158 307/18
9,099,919 B2 * 8/2015 Jing ...................... H02M 3/158
9,203,310 B2 12/2015 Huang et al.
9,203,312 B2 * 12/2015 Chesneau ............. H02M 3/156
10,320,287 B2 6/2019 Yang et al.
10,622,900 B1 * 4/2020 Wei ..................... H02M 3/1584
10,790,744 B1 * 9/2020 Lu ....................... H02M 3/1582
10,819,233 B2 10/2020 Xue et al.
10,924,017 B2 2/2021 Guo et al.
11,575,320 B2 * 2/2023 Burkhart ............. H02M 3/1582
12,170,485 B2 * 12/2024 Nomiyama ........... H02M 3/157
12,476,540 B2 * 11/2025 Yang ..................... H02M 3/158
2008/0062725 A1 * 3/2008 Yang ................. H02M 3/33561 363/21.1
2008/0231115 A1 * 9/2008 Cho .................. H02M 3/33561 307/41
2011/0043181 A1 * 2/2011 Jing ...................... H02M 3/158 323/288
2011/0068757 A1 * 3/2011 Xu ........................ H02M 3/158 323/271
2011/0089917 A1 * 4/2011 Chen ................... H02M 3/1584 323/282
2012/0218784 A1 * 8/2012 Duvnjak ........... H02M 3/33561 363/21.01
2012/0274134 A1 * 11/2012 Gasparini ........... H02M 3/1584 307/31
2012/0286576 A1 * 11/2012 Jing ...................... H02M 3/158 307/43
2012/0299567 A1 * 11/2012 Wu ....................... H02M 3/157 323/282
2012/0326691 A1 * 12/2012 Kuan .................... H02M 3/158 323/299
2013/0154588 A1 * 6/2013 Gilliom ................. H02M 3/158 323/267
2014/0145692 A1 * 5/2014 Miyamae ............. H02M 3/158 323/271
2014/0232359 A1 * 8/2014 Dash ..................... H02M 3/158 323/235
2017/0012529 A1 * 1/2017 Yamada ................ H02M 3/158
2017/0054367 A1 * 2/2017 Dhanasekaran ...... H02M 3/335
2017/0194857 A1 * 7/2017 Hang ...................... H02M 3/02
2018/0092179 A1 * 3/2018 Guo ........................ H02M 1/14
2019/0068051 A1 * 2/2019 Yang ..................... H02M 3/158
2019/0214906 A1 * 7/2019 Mahmoudi ........... H02M 3/158
2020/0091836 A1 * 3/2020 Lee ..................... H02M 7/4826
2020/0244167 A1 * 7/2020 Delano ................. H02M 3/157
2021/0152082 A1 * 5/2021 Ozanoglu ........... H02M 1/0009
2021/0313936 A1 * 10/2021 Garrett .................. H02M 3/158
2021/0391792 A1 * 12/2021 Burkhart ............. H02M 3/1584
2022/0181974 A1 * 6/2022 Liu ....................... H02M 3/155
2022/0416661 A1 12/2022 Cheng et al.
2023/0170805 A1 6/2023 Wei et al.
2023/0216409 A1 * 7/2023 Ravi ....................... H02M 3/07 323/282
2023/0353062 A1 * 11/2023 Hsieh .................... H02M 1/088

FOREIGN PATENT DOCUMENTS

CN 115800740 A 3/2023
CN 116232063 A 6/2023
KR 10-2023-0025389 A 2/2023
WO 2021/262185 A1 12/2021

OTHER PUBLICATIONS

Myeong-Gyu Yang et al., "SIMO DC-DC Converter with Low-Complexity Hybrid Comparator-Charge Control", Energies, vol. 15, No. 3, Article 783, Jan. 21, 2022, 15 pages, DOI: 10.3390/en15030783.

Ngoc-Son Pham et al., "A 0.016 mV/mA Cross-regulation 5-Output SIMO DC-DC Buck Converter Using Output-Voltage-Aware Charge Control Scheme", IEEE Transactions on Power Electronics, vol. 33, No. 11, Dec. 21, 2017, 13 pages, DOI: 10.1109/TPEL.2017.2785838.

* cited by examiner

METHOD AND SYSTEM FOR OPERATING MULTIPLE OUTPUT SWITCHING CONVERTERS COMPRISING PWM DUTY SPLIT CONTROLLER

CROSS-REFERENCE TO RELATED APPLICATIONS

This application claims benefit of priority under 35 U.S.C. § 119 to Indian Patent Application No. 202341022619, filed on Mar. 14, 2024, and to Indian Provisional Patent Application No. 202341022619, filed on Mar. 28, 2023, in the Indian Patent Office, the disclosures of which are incorporated by reference herein in their entireties.

BACKGROUND

1. Field

The present disclosure relates generally to multiple output switching converters, and more particularly, to a method and a system for operating multiple output switching converters for mid-power and low-power applications.

2. Description of Related Art

Examples of multiple output switching converters may include power electronic devices that may convert electrical energy from one form to another while producing various output voltages and/or currents at a substantially similar and/or the same time. The multiple output switching converters (and/or parallel converters) may be used in power management integrated circuits (PMICs) to provide multiple voltage outputs with different current ratings and voltage levels with relatively high efficiency and/or reliability. For example, the multiple output switching converters may be utilized in a variety of applications, including, but not limited to, electronic device power supply, telecommunications equipment, industrial machinery, renewable energy systems, and the like. The multiple output switching converters may provide numerous voltage and/or current levels that may be needed to power distinct components and/or subsystems. For example, a computer motherboard (e.g., printed circuit board (PCB)) may include various electronic and/or semiconductor devices that may need numerous (and/or distinct) output voltages. In such an example, the computer motherboard may include a central processing unit (CPU) that may need a voltage of +12 Volts (V), other accessories that may need +5V, and/or audio circuitry may need −12V.

Related systems may convert the multiple output switching converters into a single system, circuit, and/or module. That is, the related systems may combine several converters that may provide different output voltages into a single system, circuit, and/or module that may provide a more efficient and/or streamlined power supply solution that may provide for the voltage and/or current needs of various components and/or subsystems, when compared with the individual converters. That is, by combining multiple output switching converters into the single system, circuit, and/or module, the combined converter may be comparatively easier to monitor and to regulate the power supply, which may potentially provide for a simplified design, space savings, cost efficiency, increased overall efficiency, and/or enhanced performance, when compared with the individual converters.

However, the multiple output switching converters may be limited in certain aspects, which may become more relevant when combined into a single system, circuit, and/or module. For example, the combined systems may have complex control methodologies, which may be needed to regulate the output voltages and/or currents of each converter. As another example, the combined systems may have cross-coupling effects between one or more output rails, which may cause disturbances in the single system, circuit, and/or module that may affect overall performance.

Thus, there exists a need for further improvements in multiple output switching converter technology, as the need for operating multiple output switching converters may be constrained by limitations of the combined converters. Improvements are presented herein. These improvements may also be applicable to other power delivery technologies and the standards that employ these technologies.

SUMMARY

This summary is provided to introduce a selection of embodiments, in a simplified format, that are further described in the detailed description of the present disclosure. This summary is neither intended to identify key or essential embodiments of the present disclosure nor is this summary intended for determining the scope of the present disclosure.

According to an aspect of the present disclosure, a method for operating multiple output switching converters includes determining, by a pulse width modulation (PWM) duty split controller, a plurality of balanced reference signals including a first balanced reference signal and a second balanced reference signal, generating, by the PWM duty split controller, based on the plurality of balanced reference signals, a third balanced reference signal, the generating of the third balanced reference signal including limiting, using a limiter of the PWM duty split controller, the first balanced reference signal and the second balanced reference signal and accumulating the limited first balanced reference signal and the limited second balanced reference signal, using an accumulator of the PWM duty split controller, and operating, by the PWM duty split controller, a first switch and a plurality of second switches associated with the multiple output switching converters, based on the plurality of balanced reference signals, the third balanced reference signal, and one or more circuit parameters.

According to an aspect of the present disclosure, a system for operating multiple output switching converters includes a PWM duty split controller configured to determine a plurality of balanced reference signals including a first balanced reference signal and a second balanced reference signal, limit, using a limiter of the PWM duty split controller, the plurality of balanced reference signals, accumulate, using an accumulator of the PWM duty split controller, the plurality of limited balanced reference signals, generate, based on the accumulated plurality of limited balanced reference signals, a third balanced reference signal, and operate a first switch and a plurality of second switches associated with the multiple output switching converters, based on the plurality of balanced reference signals, the third balanced reference signal, and one or more circuit parameters.

To further clarify the advantages and features of the present disclosure, a more particular description of the disclosure is rendered by reference to specific embodiments thereof, which are illustrated in the appended drawings. It is to be understood that these drawings depict only example embodiments of the present disclosure and are therefore not to be considered limiting of its scope. The present disclosure is described and explained with additional specificity and detail in the accompanying drawings.

BRIEF DESCRIPTION OF DRAWINGS

These and other features, aspects, and advantages of certain embodiments of the present disclosure may be more apparent from the following description taken in conjunction with the accompanying drawings, in which.

DETAILED DESCRIPTION

Figure 1:
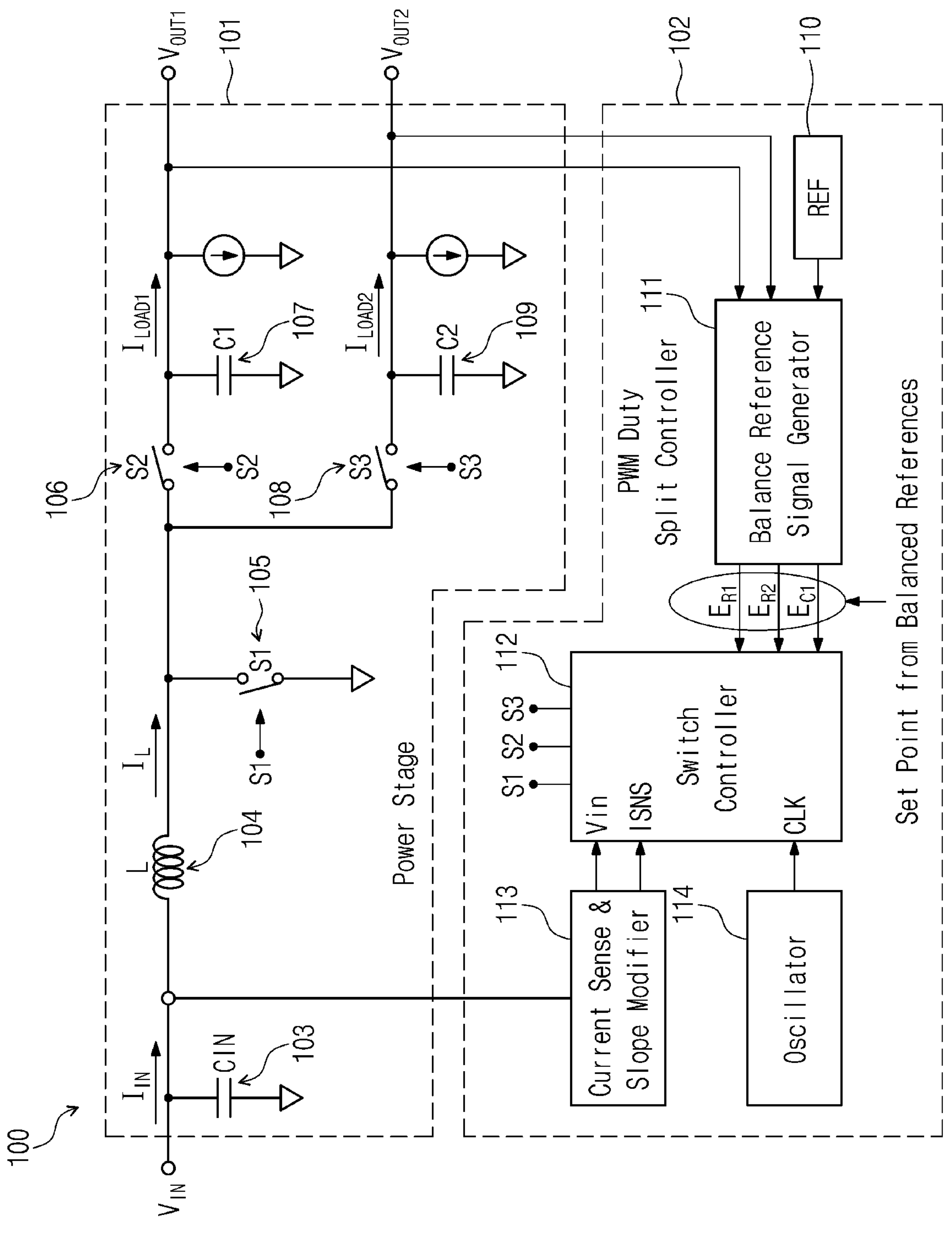
FIG. 1 illustrates a schematic diagram of a system for operating multiple output switching converters, according to an embodiment as disclosed herein.

For the purpose of promoting an understanding of the principles of the present disclosure, reference is made to the embodiments illustrated in the drawings and specific language may be used to describe the same. It is to be understood that no limitation of the scope of the present disclosure is thereby intended, such alterations and further modifications in the illustrated system, and such further applications of the principles of the present disclosure as illustrated therein being contemplated as would normally occur to one skilled in the art to which the invention relates.

Further, skilled artisans may appreciate that elements in the drawings are illustrated for simplicity and may not have necessarily been drawn to scale. For example, the flow charts may illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that may be pertinent to understanding the embodiments of the present disclosure so as not to obscure the drawings with details that may be readily apparent to those of ordinary skill in the art having the benefit of the description herein.

It is to be understood by those skilled in the art that the foregoing general description and the following detailed description are explanatory of the present disclosure and are not intended to be restrictive thereof.

Reference throughout the present disclosure to "an aspect", "another aspect" or similar language may indicate that a particular feature, structure, or characteristic described in connection with the embodiment is included in at least one embodiment of the present disclosure. Thus, appearances of the phrase "in an embodiment", "in one embodiment", "in another embodiment", and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. Also, the various embodiments described herein may not necessarily be mutually exclusive, as some embodiments may be combined with one or more other embodiments to form new embodiments. The term "or" as used herein, may refer to a non-exclusive or unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

The accompanying drawings may be used to help easily understand various technical features and it is to be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, and the like may be used herein to describe various elements, these elements should not be limited by these terms. These terms are generally only used to distinguish one element from another.

Throughout this disclosure, the terms "balanced reference signal generator" and "balance reference signal generator" may be used interchangeably and may refer to the same. Throughout this disclosure, the terms "$E_{R1}$" and "Error_1" may be used interchangeably and may refer to the same. Throughout this disclosure, the terms "$E_{R2}$" and "Error_2" may be used interchangeably and refer to the same. Throughout this disclosure, the terms "$E_{CL}$" and "Error_C" may be used interchangeably and may refer to the same.

Referring now to the drawings, and more particularly to FIGS. 1 to 5, various embodiments of the present disclosure are described with reference to the accompanying drawings.

FIG. 1 illustrates a schematic diagram of a system 100 for operating multiple output switching converters, according to an embodiment as disclosed herein.

The system 100 may include a power stage 101 and a pulse width modulation (PWM) duty split controller 102. The power stage 101 may be and/or may include a single inductor multi-output boost power converter. For example, the power stage 101 may include an inductor L 104 (e.g., inductor L), one or more capacitors (e.g., an input capacitor $C_{IN}$ 103, a first capacitor $C_1$ 107, and a second capacitor $C_2$ 109), a first switch S1 105, and a plurality of second switches (e.g., a second switch S2 106 and a third switch S3 108). The components of the power stage 101 may be arranged and/or coupled in a particular arrangement and/or configuration for providing the functionality of a single inductor multi-output boost power converter. The single inductor multi-output boost power converter may be and/or may refer to a type of power converter that may use the inductor L 104 to generate multiple output voltages (e.g., a first output voltage $V_{OUT1}$ and a second output voltage $V_{OUT2}$) that may be higher than an input voltage $V_{IN}$. In one or more embodiments, the multiple output voltages may be more than two output voltages (e.g., the first output voltage $V_{OUT1}$, the second output voltage $V_{OUT2}$, a third output voltage $V_{OUT3}$, a fourth output voltage $V_{OUT4}$, and the like).

In an embodiment, the input voltage $V_{IN}$ may be boosted using a switching mechanism (e.g., the first switch S1 105, the second switch S2 106, and the third switch S3 108), using energy that may be stored in the inductor L 104. The stored energy may be transferred to multiple output stages (e.g., the first output voltage $V_{OUT1}$ and the second output voltage $V_{OUT2}$), each output stage having a corresponding voltage regulation circuitry. The output voltages (e.g., the first output voltage $V_{OUT1}$ and the second output voltage $V_{OUT2}$) may be independently regulated to different levels as needed by a specific application and/or by design constraints.

In order to regulate the output voltages (e.g., the first output voltage $V_{OUT1}$ and the second output voltage $V_{OUT2}$) and/or currents (e.g., an inductor current $I_L$, a first load current $I_{LOAD1}$, and a second load current $I_{LOAD2}$) associated with one or more converters and to potentially prevent cross-coupling effects, the system 100 may use the PWM duty split controller 102 as a feedback system. That is, the system 100 may provide a simple control methodology to regulate the output voltages (e.g., the first output voltage $V_{OUT1}$ and the second output voltage $V_{OUT2}$) and/or currents (e.g., the inductor current $I_L$, the first load current $I_{LOAD1}$, and the second load current $I_{LOAD2}$) and to potentially prevent and/or reduce cross-coupling effects.

In one or more embodiments, the PWM duty split controller 102 may include a reference module 110, a balanced reference signal generator 111 (e.g., an error logic), a switch controller 112, a current sense and slope modifier 113, and an oscillator 114.

In one or more embodiments, the reference module 110 may generate a reference voltage. The generated reference voltage may be used as an input of an error amplifier (e.g., the balanced reference signal generator 111).

In one or more embodiments, the balanced reference signal generator 111 may determine a plurality of balanced reference signals. The plurality of balanced reference signals may include a first balanced reference signal $E_{R1}$ and a second balanced reference signal $E_{R2}$, as described with reference to FIG. 2. The balanced reference signal generator 111 may generate, based on the determined plurality of balanced reference signals (e.g., the first balanced reference signal $E_{R1}$ and the second balanced reference signal $E_{R2}$), a third balanced reference signal $E_{CL}$. The first balanced reference signal ($E_{R1}$) and the second balanced reference signal ($E_{R2}$) may be limited using a limiter of the PWM duty split controller 102 and fed to an accumulator of the PWM duty split controller 102 to generate the third balanced reference signal $E_{CL}$, as described with reference to FIG. 2.

In one or more embodiments, the switch controller 112 (e.g., gate drivers and/or buffers) may operate the first switch S1 105 and/or the plurality of second switches (e.g., the second switch S2 106 and the third switch S3 108) associated with the multiple output switching converters based on the plurality of balanced reference signals (e.g., the first balanced reference signal $E_{R1}$ and the balanced reference signal $E_{R2}$), the third balanced reference signal $E_{CL}$, and one or more circuit parameters, as described with reference to FIGS. 3A, 3B, and 4A to 4E. The one or more circuit parameters may include at least one of an inductor current sense voltage $V_{CS}$, an inductor current $I_L$, a clock CLK signal, an input voltage $V_{in}$, a first signal $Q_1$, a second signal $Q_2$, and a third signal $Q_3$.

In one or more embodiments, the current sense and slope modifier 113 may regulate one or more output currents (e.g., the inductor current $I_L$, the first load current $I_{LOAD1}$, and the second load current $I_{LOAD2}$) and maintain the one or more output currents at the desired levels (e.g., first current level $E_1$, second current level $E_2$, third current level $E_3$, and the like) by utilizing the switch controller 112, as described with reference to FIGS. 3A and 3B. That is, the current sense and slope modifier 113 may measure the one or more output currents of each stage and compare the one or more output currents with the desired current level. In some embodiments, the desired current levels (e.g., first current level $E_1$, second current level $E_2$, third current level $E_3$, and the like) may correspond to the plurality of balanced reference signals (e.g., the first balanced reference signal $E_{R1}$ and the balanced reference signal $E_{R2}$, and the third balanced reference signal $E_{CL}$). If the one or more output currents are higher (e.g., greater) than the desired level, the current sense and slope modifier 113 may reduce a slope of a switching waveform, which in turn may reduce the current flowing through the inductor L 104 and/or may lower the one or more output currents. Alternatively or additionally, if the one or more output currents are lower (e.g., less) than the desired level, the current sense and slope modifier 113 may increase the slope of the switching waveform, which may increase the current flowing through the inductor L 104 and may boost the one or more output currents.

In one or more embodiments, the oscillator 114 may generate a switching waveform (e.g., clock waveform) for the switch controller 112 that may drive the switching mechanism of the first switch S1 105 and/or the plurality of second switches (e.g., the second switch S2 106 and the third switch S3 108) associated with the multiple output switching converters. The oscillator 114 may generate a periodic waveform with a fixed frequency and duty cycle, which may be used to control the operation of the converter, as described with reference to FIGS. 3A and 3B. The frequency of the oscillator waveform may determine the rate at which energy may be transferred from the input to the output stages. In addition, the duty cycle of the oscillator waveform may determine the amount of energy transferred.

In one or more embodiments, the system 100 may use two balanced error amplifiers/compensators outputs which may be fed with the respective output rails to generate multiple balanced reference signals for the control, as described with reference to FIG. 2. Further, a limiter may be present to check the balanced reference signals generated for the upper and lower bounds to give signals to the switch controller 112, as described with reference to with FIG. 2. Further, a cumulative charge balancer may be used to add the balanced reference signals and generate set points for the switch controller 112, as described with reference to with FIG. 2.

In one or more embodiments, the switch controller 112 may be configured to perform duty distribution for one or more output channels (e.g., the first output voltage $V_{OUT1}$ and the second output voltage $V_{OUT2}$). For example, the switch controller 112 may determine whether to skip channels and/or add extra cycles in order to facilitate a balanced performance, as described below.

In an embodiment, the switch controller 112 may use a peak current of the inductor 104 and input voltage Vin based switching main power FET (e.g., switch S1 105) for the accumulation phase of the duty cycle, as described with reference to with FIGS. 3B, 4A and 4B.

In an embodiment, for the distribution/shared phase of the duty cycle, the switch controller 112 may use an inductor valley current and input voltage Vin based switching of multiple output FETs prioritized on load currents (e.g., the second switch S2 106 and the third switch S3 108), as described with reference to with FIGS. 3B and 4C to 4E.

In one or more embodiments, the switch controller 112 may be extended to multiple output configurations by sequentially accumulating the balanced references. In one or more embodiments, the switch controller 112 may be implemented in a single inductor multiple output (SIMO) converter with dual outputs to provide two boost outputs from a single supply using a single inductor. As such, aspects of the present disclosure may be targeted in converters with continuous conduction mode (CCM) operation for medium to higher load currents where related discontinuous conduction mode (DCM) multiple output converters may be unable to provide adequate root mean square (RMS) currents (e.g., RMS currents greater than 300 milliamperes (mA)). In one or more embodiments, the switch controller 112 may use charge-balanced current mode control and/or fixed frequency pulse width modulation to potentially reduce and/or prevent poor performance of voltage mode control during transients.

Although FIG. 1 shows various hardware components of the system 100, it is to be understood that other embodiments are not limited thereon. In other embodiments, the system 100 may include less or more number of components. Further, the labels and/or names of the components are used only for illustrative purposes and may not limit the scope of the disclosure. One or more components may be combined to perform the same and/or substantially similar functions to operate the multiple output switching converters.

Figure 2:
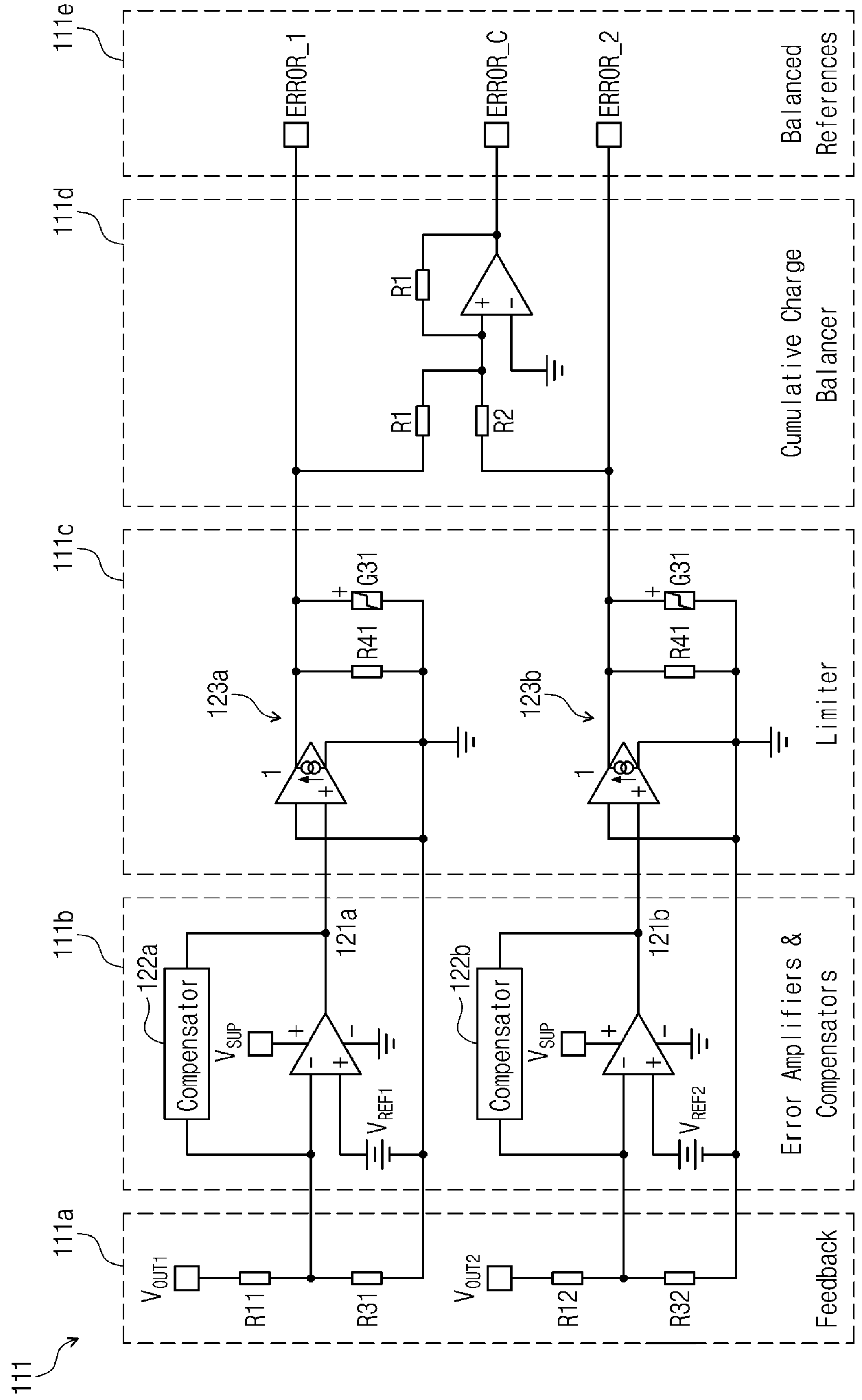
FIG. 2 illustrates a schematic diagram of a balanced signal generator associated with the system to generate a plurality of balanced reference signals for operating the multiple output switching converters, according to an embodiment as disclosed herein.

FIG. 2 illustrates a schematic diagram of the balanced reference signal generator 111 associated with the system 100 to generate the plurality of balanced reference signals (e.g., a first balanced reference signal Error_1 and a second balanced reference signal Error_2) for operating the multiple output switching converters, according to an embodiment as disclosed herein.

The schematic diagram of the balanced reference signal generator 111 is divided into five distinct modules, each serving a specific function. The first module 111*a* may be configured to provide feedback from the output channels (e.g., the first output channel $V_{OUT1}$ and the second output channel $V_{OUT2}$) to the second module 111*b*. For example, the first module 111*a* may include resistors (e.g., first resistor R11, second resistor R31, third resistor R12, and fourth resistor R32) that may be configured to provide the output channels (e.g., the first output channel VOUT1 and the second output channel VOUT2) to the second module 111*b*.

The second module 111*b* may include an error amplifier and one or more compensators, which may correct errors in the output signals. That is, the second module 111*b* may include a first operational amplifier 121*a* and a first compensator 122*a* to determine the first balanced reference signal (e.g., $E_{R1}$ or Error_1). In addition, the second module

111*b* may include a second operational amplifier 121*b* and a second compensator 122*b* to determine the second balanced reference signal (e.g., $E_{R2}$ or Error_2).

The third module 111*c* may be and/or may include one or more limiter circuits (e.g., a first limiter circuit 123*a* and a second limiter circuit 123*b*), which may limit the amplitude of the output signals to potentially prevent and/or reduce distortion. As shown in FIG. 2, each of the first and second limiter circuits 123*a* and 123*b* may include a transconductance amplifier 1, a resistor R41, and a fuse G31.

The fourth module 111*d* may be and/or may include a cumulative charge balancer circuit (e.g., accumulator), which may balance the charge across the output channels to potentially provide equal and/or stable output voltages. For example, the fourth module 111*d* may include resistors (e.g., a first resistor R1 and a second resistor R2) and/or amplifiers configured to accumulate the output channels (e.g., the first output channel $V_{OUT1}$ and the second output channel $V_{OUT2}$).

The fifth module 111*e* may be configured to generate the third balanced reference signal Error_C (e.g., $E_{CL}$), which may be needed for the operation of the switch controller 112, as described with reference to with FIGS. 3A and 3B.

Figure 3A:
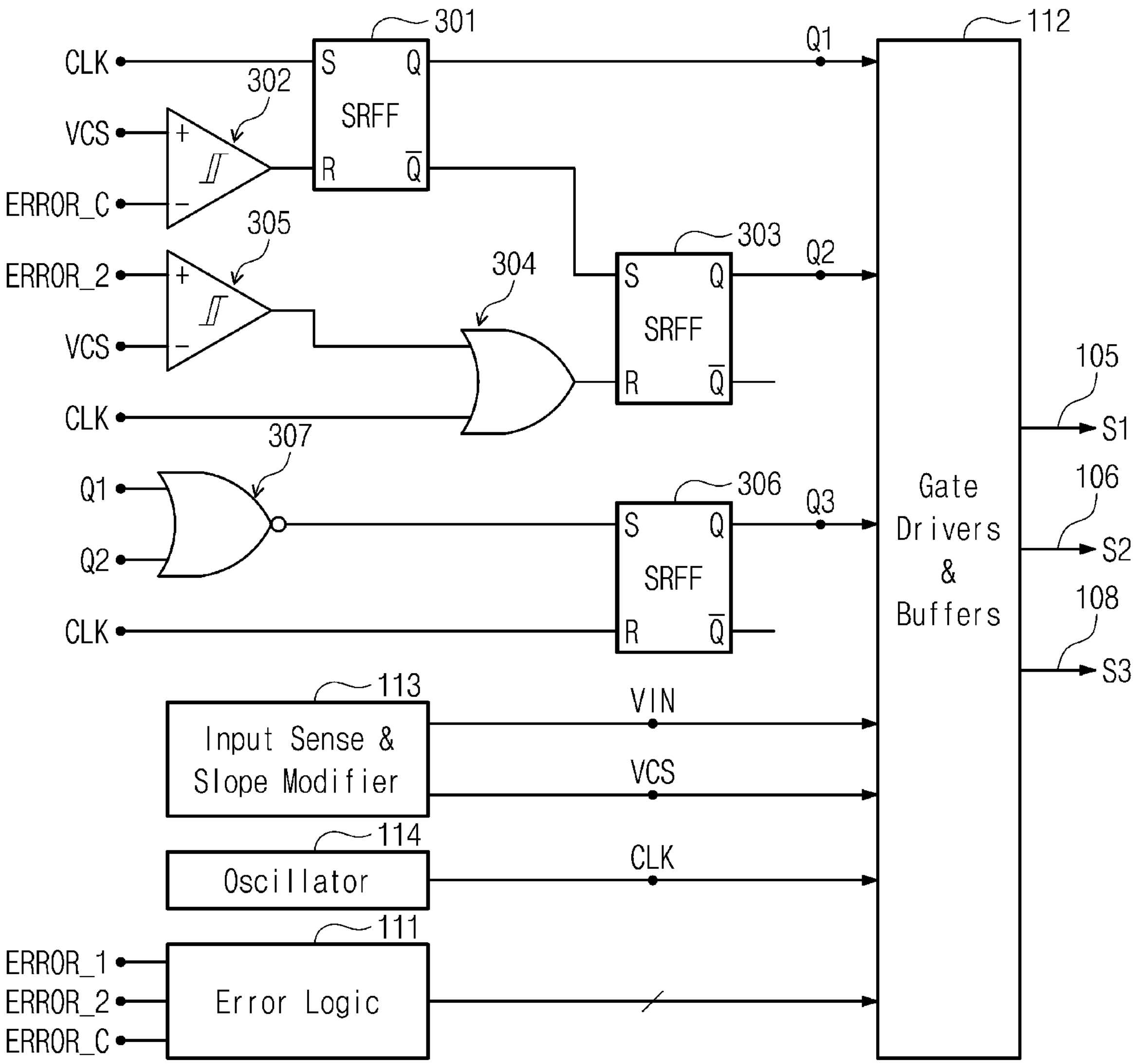
FIG. 3A illustrates a schematic diagram of a switch controller associated with the system to operate the multiple output switching converters, according to an embodiment as disclosed herein.

FIG. 3A illustrates a schematic diagram of the switch controller 112 associated with the system 100 to operate the multiple output switching converters, according to an embodiment as disclosed herein.

The switch controller 112 may operate the first switch S1 105 and the plurality of second switches (e.g., the second switch S2 106 and the third switch S3 108) associated with the multiple output switching converters based on the plurality of balanced reference signals (e.g., the first balanced reference signal Error_1 and the second balanced reference signal Error_2), the generated third balanced reference signal, Error_C (e.g., $E_{CL}$), and the one or more circuit parameters. The one or more circuit parameters may include the inductor current sense voltage $V_{CS}$, the inductor current $I_L$, the clock signal CLK, the input voltage $V_{in}$, the first signal $Q_1$, the second signal $Q_2$, and the third signal $Q_3$.

The first signal $Q_1$ may be generated by utilizing a first SR flip-flop 301, a first comparator 302, the clock signal CLK, the inductor current sense voltage $V_{CS}$ signal, and the generated third balanced reference signal Error_C (e.g., $E_{CL}$). The first SR flip-flop 301 may have two inputs, namely, a set input S and a reset input R. The set input S of the first SR flip-flop 301 may be connected to the clock signal CLK, and the reset input R of the first SR flip-flop 301 may be connected to an output of the first comparator 302. The first comparator 302 may have two inputs, namely, a non-inverting input "+" and an inverting input "−". The non-inverting input "+" of the first comparator 302 may be connected to the inductor current sense voltage $V_{CS}$ signal. The inverting input "−" of the first comparator 302 may connected to the generated third balanced reference signal Error_C (e.g., $E_{CL}$). The first comparator 302 may generate a reference signal that determine when a memory element (e.g., the first SR flip-flop 301) is to be reset.

In the first signal $Q_1$ generation scenario, the inductor current sense voltage $V_{CS}$ signal may be an input that may represent the current state of the system 100, and the generated third balanced reference signal Error_C (e.g., $E_{CL}$) may be used to compare against the inductor current sense voltage $V_{CS}$ signal. For example, when the inductor current sense voltage $V_{CS}$ signal matches the third balanced reference signal Error_C (e.g., $E_{CL}$), the first comparator 302 may output a high signal (e.g., "1") to the reset input R of the first SR flip-flop 301. As a result, the memory element of the first SR flip-flop 301 may be reset, clearing a stored state of the first SR flip-flop 301.

The second signal $Q_2$ may be generated by utilizing a second SR flip-flop 303, an OR gate 304, a second comparator 305, an inverted output signal $\overline{Q}$ of the first SR flip-flop 301, the clock signal CLK, the inductor current sense voltage $V_{CS}$ signal, and the second balanced reference signal Error_2 (e.g., $E_{R2}$). The second SR flip-flop 303 may have two inputs, namely, a set input S and a reset input R. The set input S of the second SR flip-flop 303 may be connected to an inverted output signal $\overline{Q}$ of the first SR flip-flop 301, and the reset input R of the second SR flip-flop 303 may be connected to an output signal of the OR gate 304. The output signal of the OR gate 304 may be generated based on an output signal Q of the second comparator 305 and the clock signal CLK. The second comparator 305 may have two inputs, namely, a non-inverting input "+" and an inverting input "−". The non-inverting input "+" of the second comparator 305 may be connected to the second balanced reference signal Error_2 (e.g., $E_{R2}$), and the inverting input "−" of the second comparator 305 may be connected to the inductor current sense voltage $V_{CS}$ signal.

In the second signal $Q_2$ generation scenario, when the first SR flip-flop 301 outputs a low signal (e.g., "0"), the second SR flip-flop 303 may be set. Further, the OR gate 304 may generate an output signal based on the output signal of the second comparator 305 and the clock signal CLK. If either the second comparator 305 outputs a high signal (e.g., "1") or the clock signal CLK transitions from a low level to a high level, the OR gate 304 may output a high signal (e.g., "1") to the reset input R of the second SR flip-flop 303. As a result, the memory element of the second SR flip-flop 303 may be reset, clearing a stored state of the second SR flip-flop 303.

Alternatively or additionally, when the inductor current sense voltage $V_{CS}$ signal matches the second balanced reference signal Error_2 (e.g., $E_{R2}$), indicating that the error condition is present, the second comparator 305 may output a high signal (e.g., "1"). Additionally, when the clock signal CLK transitions from a low level to a high level, the OR gate 304 may be triggered to output a high signal (e.g., "1"). In such a scenario, where both conditions are met (e.g., the second comparator 305 outputs a high signal due to the error condition, and the clock signal CLK transitions from a low level to a high level), the OR gate 304 may output a high signal (e.g., "1") to the reset input R of the second SR flip-flop 303. As a result, the memory element of the second SR flip-flop 303 may be reset, clearing a stored state of the second SR flip-flop 303.

The third signal $Q_3$ may be generated by utilizing a third SR flip-flop 306, the first signal $Q_1$, the second signal $Q_2$, and the clock signal CLK. The third SR flip-flop 306 may have two inputs, namely, a set input S and a reset input R. The set input S of the third SR flip-flop 306 may be connected to an output signal of a NOR gate 307, and the reset input R of the third SR flip-flop 306 may be connected to the clock signal CLK. The NOR gate 307 may have two inputs, namely, a first input and a second input. The first input of the NOR gate 307 may be connected to the first signal $Q_1$, and the second input of the NOR gate 307 may be connected to the second signal $Q_2$. In the third signal $Q_3$ generation scenario, when both the first signal $Q_1$ and the second signal $Q_2$ signals are at a low level (e.g., "0"), the third SR flip-flop 306 output may be set. When the clock signal CLK transitions from a low level to a high level, the memory element of the third SR flip-flop 306 may be reset, clearing a stored state of the third SR flip-flop 306.

Figure 3B:
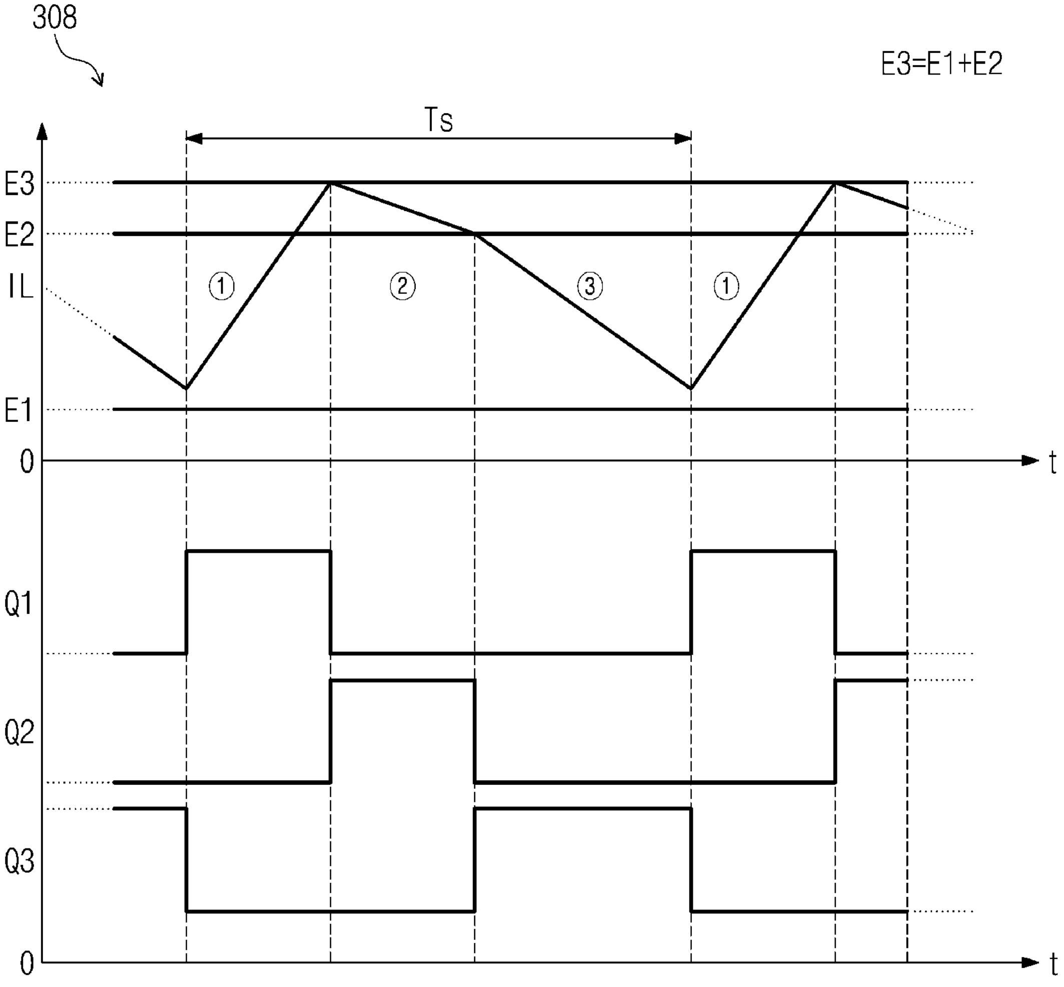
FIG. 3B illustrates a timing scheme associated with the switch controller, according to an embodiment as disclosed herein.

FIG. 3B illustrates a timing scheme 308 associated with the switch controller 112, according to an embodiment as disclosed herein. The timing scheme 308 may represent an energizing phase, a de-energizing phase via $V_{OUT1}$, and a de-energizing phase via $V_{OUT2}$, as described with reference to FIGS. 4A to 4E.

During an energy accumulation (or energizing) phase (indicated as ① in FIG. 3B), the PWM duty split controller 102 may continuously monitor a value of the inductor current $I_L$. For example, the PWM duty split controller 102 may monitor the value of inductor current $I_L$ in a periodic, semi-persistent, and/or aperiodic manner. However, the present disclosure is not limited in this regard. The PWM duty split controller 102 may turn on the first switch S1 105 for the energy accumulation phase ① when the value of the inductor current $I_L$ is lower (e.g., less) than the value of the third balanced reference signal Error_C (e.g., $E_{CL}$), where a value of the clock signal CLK is equal to one (e.g., the clock signal CLK is at a high level). That is, when a value of the first signal $Q_1$ is high (e.g., "1") and a value of the second signal $Q_2$ is low (e.g., "0"), then the inductor L 104 may enter into the energy accumulation phase ①.

The energy accumulation phase ① may occur when the first switch S1 105 is turned on, connecting the input voltage $V_{in}$ to the inductor L 104. As the first switch S1 105 is turned on, the inductor L 104 may start to accumulate energy. The inductor L 104 may resist changes in current flow, causing the current to rise gradually. The rate of change of current may be determined by the input voltage $V_{in}$, an inductance value, and/or load conditions. During the energy accumulation phase ①, energy from the input voltage $V_{in}$ may be transferred to the inductor L 104 and stored in magnetic fields of the inductor L 104. That is, the inductor L 104 may act as an energy storage device and store energy in the form of a magnetic field.

Once the desired amount of energy is accumulated in the inductor L 104, the PWM duty split controller 102 may trigger the next phases (indicated as ② and ③ in FIG. 3B), which may be referred to as a de-energizing phase (energy distribution phase) via $V_{OUT1}$ and $V_{OUT2}$, respectively. That is, the PWM duty split controller 102 may turn off the first switch S1 105 and turn on the plurality of second switches (e.g., the second switch S2 106 and the third switch S3 108) for the energy distribution phases ② and ③ in response to determining that the value of the inductor current $I_L$ is greater than the value of the third balanced reference signal Error_C (e.g., $E_{CL}$). In the energy distribution phases ② and ③, the plurality of second switches (e.g., the second switch S2 106 and the third switch S3 108) may be controlled to transfer the stored energy from the inductor L 104 to the output capacitors and/or loads (e.g., the first capacitor $C_1$ 107, and the second capacitor $C_2$ 109).

Figure 4A:
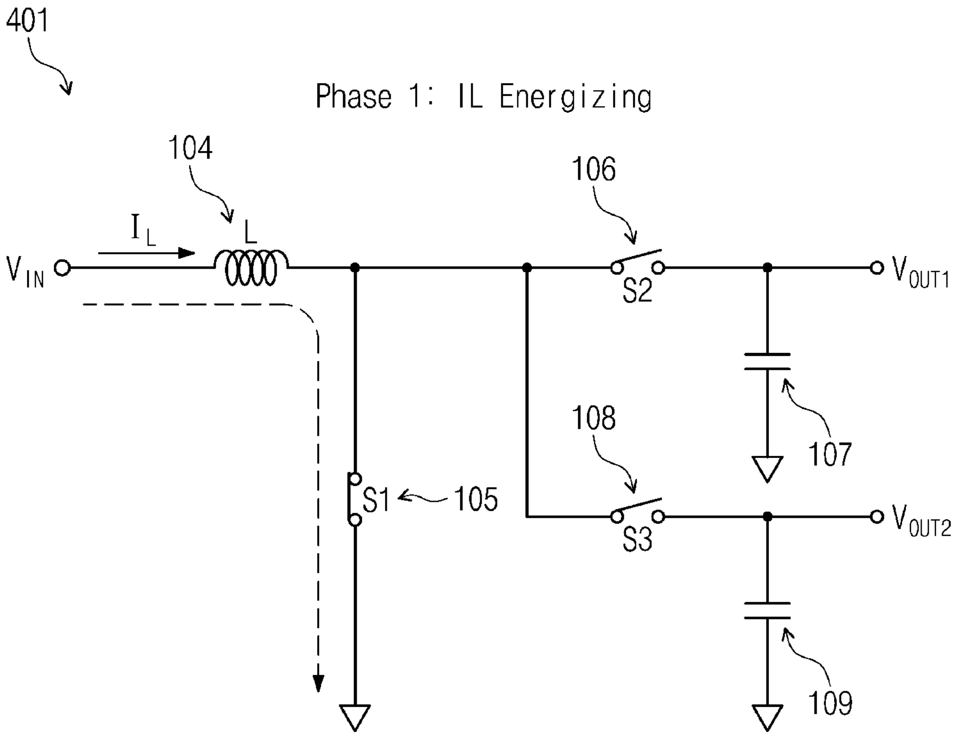
FIGS. 4A and 4B illustrate an energizing phase associated with the system along with one or more energizing operations, according to an embodiment as disclosed herein.
Figure 4B:
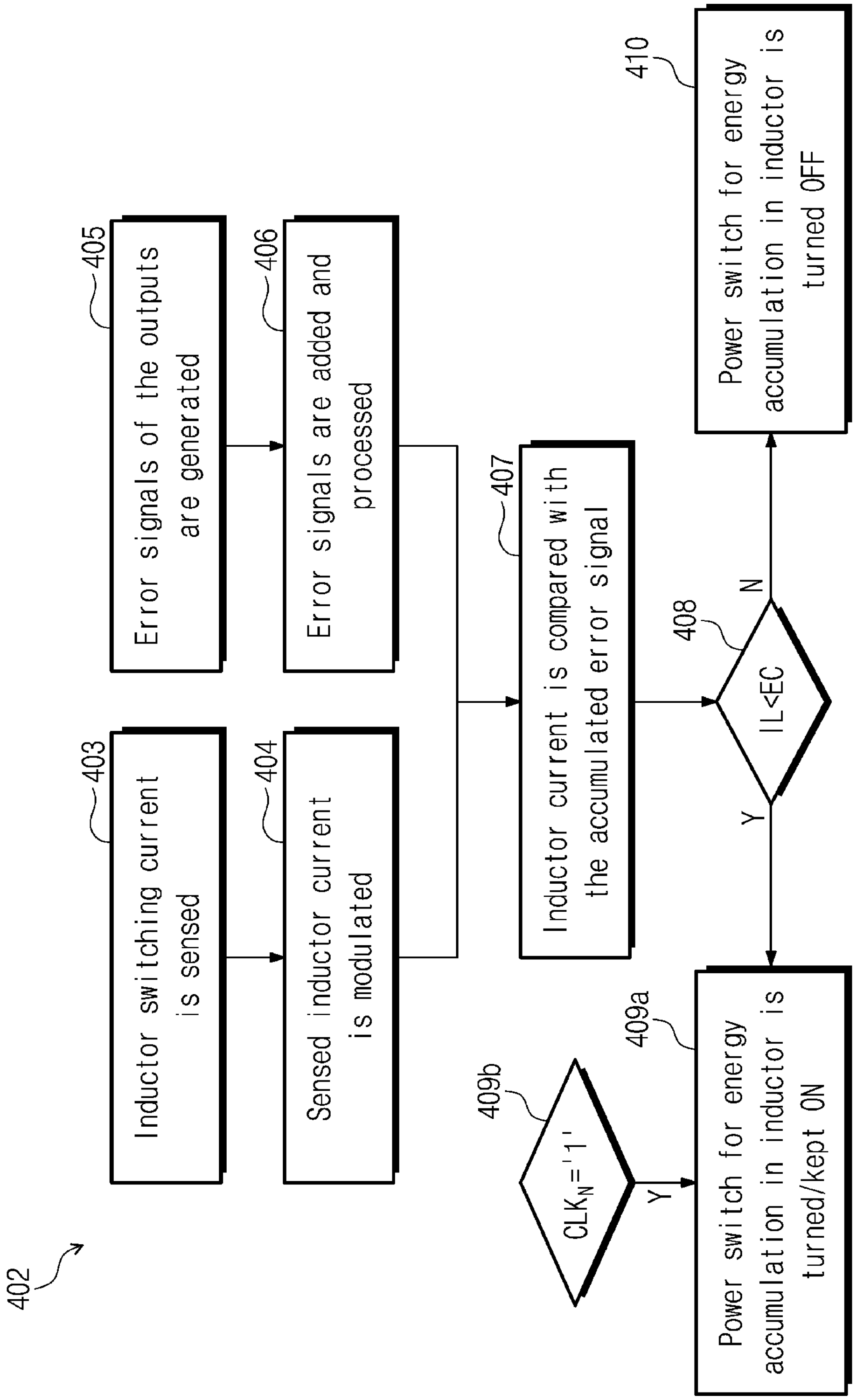

FIGS. 4A and 4B illustrate the energizing phase 401 associated with the system 100 along with one or more energizing operations 402, according to an embodiment as disclosed herein. The energizing phase 401 of FIGS. 4A and 4B may include and/or may be similar in many respects to the energy accumulation phase ① described above with reference to FIG. 3B, and may include additional features not mentioned above. Consequently, repeated descriptions of the energizing phase 401 described above with reference to FIG. 3B may be omitted for the sake of brevity.

At operation 403, the PWM duty split controller 102 may sense the inductor current $I_L$ (e.g., inductor switching current), as illustrated in the energizing phase 401. At operation

404, the PWM duty split controller 102 may modulate the inductor current $I_L$. At operations 405 and 406, the PWM duty split controller 102 may determine the plurality of balanced reference signals (e.g., the first balanced reference signal Error_1 and the second balanced reference signal Error_2). Further, the PWM duty split controller 102 may generate, based on the determined plurality of balanced reference signals, the third balanced reference signal Error_C (e.g., $E_{CL}$). Furthermore, the PWM duty split controller 102 may perform one or more processes to operate the first switch S1 105 and the plurality of second switches (e.g., the second switch S2 106 and the third switch S3 108), as described with reference to with FIGS. 3A and 3B.

At operations 407 and 408, the PWM duty split controller 102 may determine whether the value of an inductor current $I_L$ is lower (e.g., less) than the value of the third balanced reference signal Error_C (e.g., $E_{CL}$). At operation 409*a*, the PWM duty split controller 102 may turn on the first switch S1 105 for the energy accumulation phase in response to determining that the value of the inductor current $I_L$ is lower (e.g., less) than the value of the third balanced reference signal ("Y" at operation 408), where the value of the clock signal CLK is equal to one (e.g., "Y" in operation 409*b*). At operation 410, the PWM duty split controller 102 may turn off the first switch S1 105 and turn on the plurality of second switches (e.g., the second switch S2 106 and the third switch S3 108) for the energy distribution phase in response to determining that the value of the inductor current $I_L$ is greater than the value of the third balanced reference signal Error_C (e.g., $E_{CL}$) ("N" in operation 408), as described with reference to with FIGS. 4C to 4E.

Figure 4C:
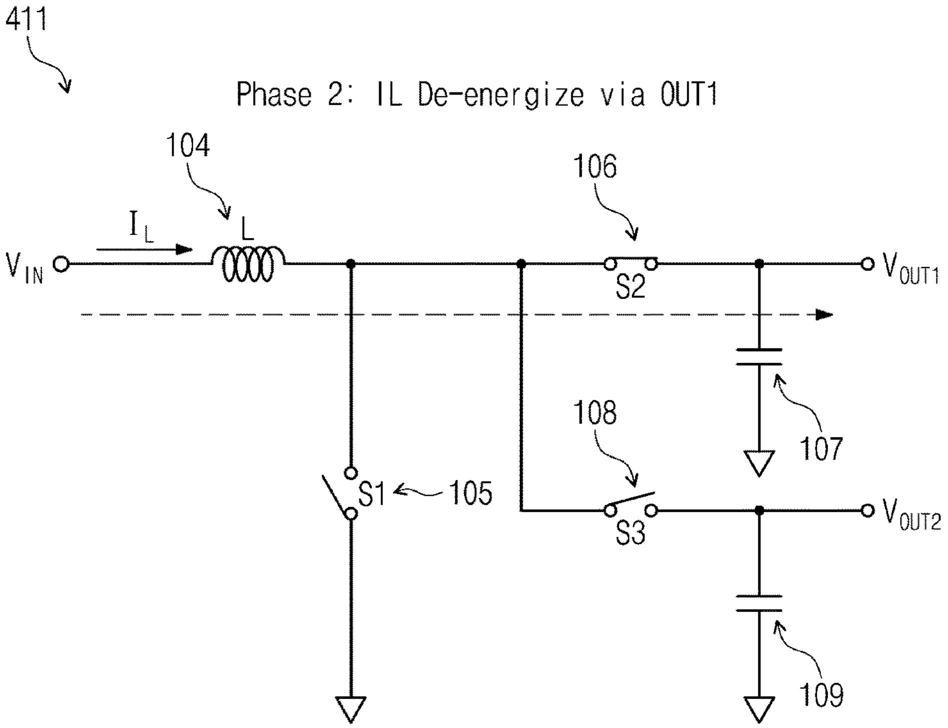
FIGS. 4C, 4D, and 4E illustrate a de-energizing phase associated with the system along with one or more de-energizing operations, according to an embodiment as disclosed herein.
Figure 4D:
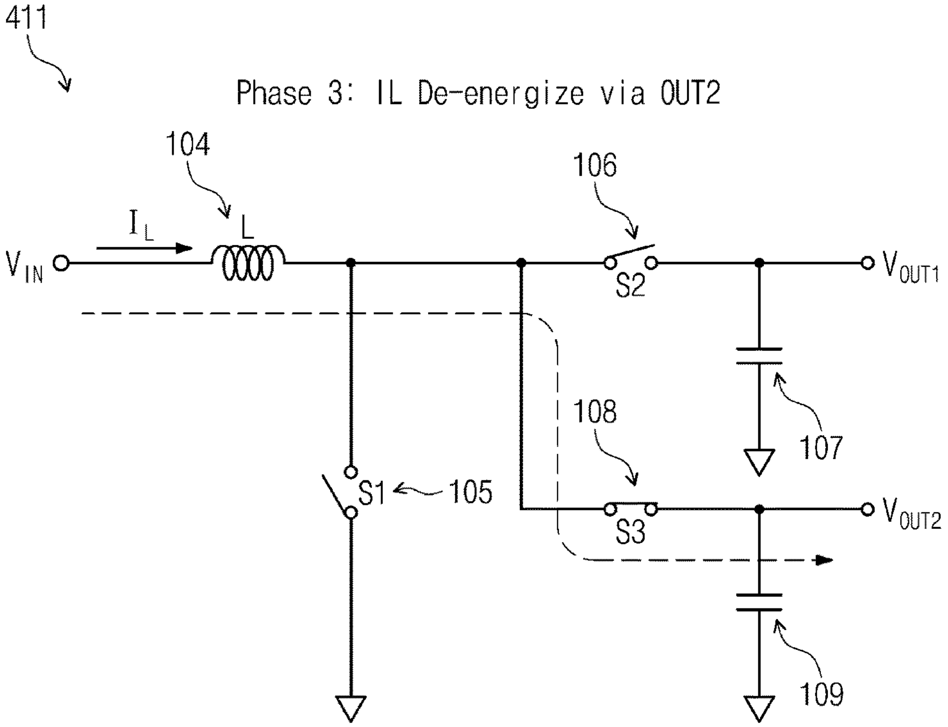
Figure 4E:
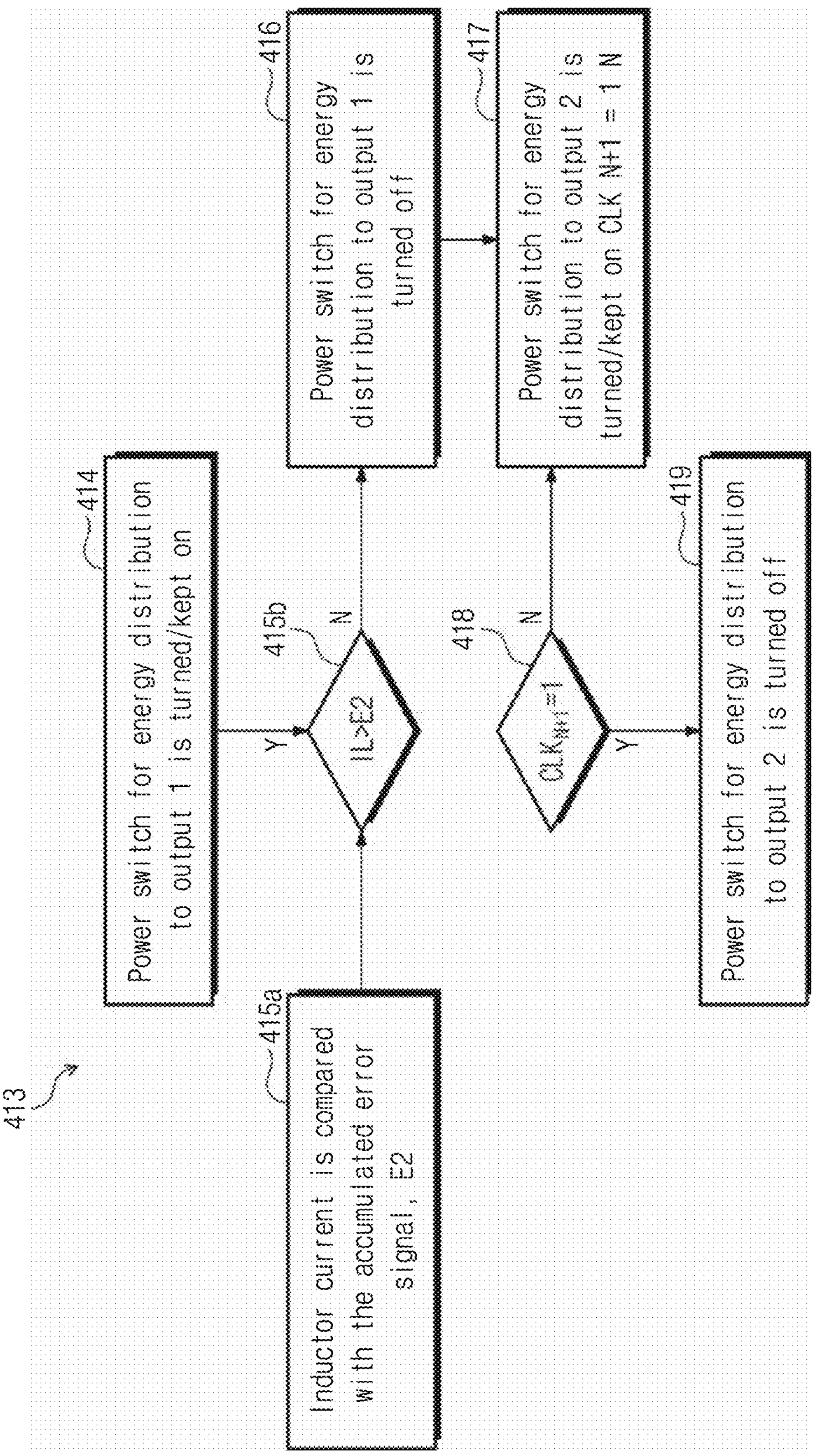

FIGS. 4C, 4D, and 4E illustrate the first de-energizing phase 411 and the second de-energizing 412 associated with the system 100 along with one or more de-energizing operations, according to an embodiment as disclosed herein. The first and second de-energizing phases 411 and 412 may include and/or may be similar in many respects to the energy distribution phases ② and ③, respectively, described above with reference to FIG. 3B, and may include additional features not mentioned above. Consequently, repeated descriptions of the first and second de-energizing phases 411 and 412 described above with reference to FIG. 3B may be omitted for the sake of brevity.

At operation 414, the PWM duty split controller 102 may perform energy distribution to the first output channel $V_{OUT1}$. At operations 415*a* and 415*b*, the PWM duty split controller 102 may determine whether the value of an inductor current $I_L$ is lower (e.g., less) than a value of the second balanced reference signal Error_2 (e.g., $E_{R2}$). The PWM duty split controller 102 may turn on the second switch S2 106 (e.g., power switch) for the energy distribution phase 411 at the first output voltage $V_{OUT1}$, in operation 414, in response to determining that the value of the inductor current $I_L$ is greater than the value of the second balanced reference signal Error_2 (e.g., $E_{R2}$) ("Y" in operation 415*b*).

At operation 416, the PWM duty split controller 102 may turn off the second switch S2 106 (e.g., power switch) for the energy distribution phase at the first output $V_{OUT1}$ in response to determining that the value of the inductor current $I_L$ is lower (e.g., less) than the value of the second balanced reference signal Error_2 (e.g., $E_{R2}$). At operations 417 and 418, the PWM duty split controller 102 may determine whether the value of the clock signal CLK is equal to one (e.g., the clock signal CLK is at a high level). The PWM duty split controller 102 may turn on the third switch S3 108 for the energy distribution phase 412 at the second output voltage $V_{OUT2}$ in response to determining that the value of the clock signal CLK is not equal to one (N at operation 418). At operation 419, the PWM duty split controller 102 may turn off the third switch S3 108 for the energy distribution phase 411 at the second output voltage $V_{OUT2}$ in response to determining that the value of the clock signal CLK is equal to one (Y at operation 418).

Figure 5:
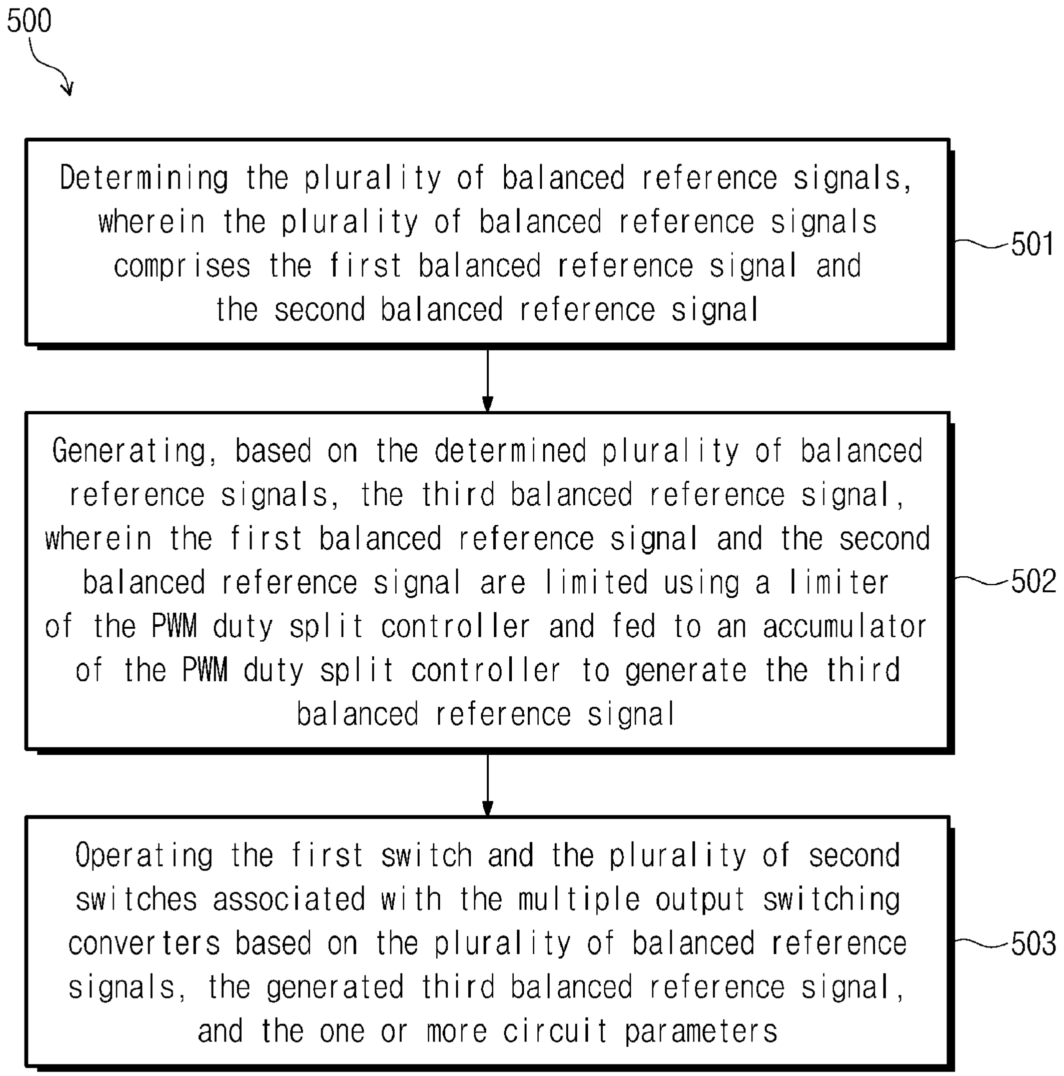
FIG. 5 is a flow diagram illustrating a method for operating multiple output switching converters, according to an embodiment as disclosed herein.

FIG. 5 is a flow diagram illustrating a method 500 for operating multiple output switching converters, according to an embodiment as disclosed herein.

At operation 501, the method 500 may include determining the plurality of balanced reference signals, wherein the plurality of balanced reference signals may include the first balanced reference signal Error_1 (e.g., $E_{R1}$) and the second balanced reference signal Error_2 (e.g., $E_{R2}$), as described with reference to FIGS. 1 and 2.

At operation 502, the method 500 may include generating, based on the determined plurality of balanced reference signals, the third balanced reference signal Error_C (e.g., $E_{CL}$), wherein the first balanced reference signal Error_1 (e.g., $E_{R1}$) and the second balanced reference signal Error_2 (e.g., $E_{R2}$) may be limited using the limiter 111*c* of the PWM duty split controller and fed to the accumulator 111*d* of the PWM duty split controller to generate the third balanced reference signal, as described with reference to FIGS. 1 and 2.

At operation 503, the method 500 may include operating the first switch S1 105 and the plurality of second switches (e.g., the second switch S2 106 and the third switch S3 108) associated with the multiple output switching converters based on the plurality of balanced reference signals, the generated third balanced reference signal Error_C (e.g., $E_{CL}$), and the one or more circuit parameters, as described with reference to FIGS. 3A, 3B, and 4A to 4E.

The method 500 may provide multiple advantages over related systems. First, for example, the method 500 may be utilized to apply a CCM control scheme to applications needing medium to heavy loads that may be needed by PMICs, while the related systems may utilize a DCM and/or a time division multiplexed design that may not be as effective in managing heavy load currents, when compared to the present disclosure. Furthermore, the related systems may also exhibit relatively significant power loss due to a freewheel path, which may cause large ripples and/or device stress on passive devices. In the CCM control scheme of the present disclosure, the inductor L 104 in the switching converters may be designed to operate continuously, and consequently, the current flowing through the inductor L 104 may be prevented from dropping to zero during each switching cycle. For example, the switching mechanism of the power stage 101 (e.g., the first switch S1 105) may be configured to prevent the inductor L 104 from being completely discharged.

Second, aspects of the present disclosure may provide for decreasing an overall size and/or footprint of the multiple output switching converters, when compared to related systems. The decreased size and/or footprint may be preferable in applications where space may be restricted, and/or compactness may be sought as a design constraint, and which may enable more effective use of available board space, making integration of the multiple output switching converter into the overall system design easier, when compared to related multiple output switching converters. That is, component costs and/or assembly complexity may be lowered, when compared to related multiple output switching converters. Furthermore, aspects of the present disclosure may simplify the production process of the multiple output switching converters, potentially increasing dependability and ease of maintenance.

Third, aspects of the present disclosure may optimize efficiency of the multiple output switching converter by simplifying the configuring of the switching mechanism, when compared to related multiple output switching converters. On that basis, aspects of the present disclosure may provide for improved energy efficiency, reduced power consumption, and/or energy savings, when compared to related multiple output switching converters. Aspects of the present disclosure may be preferable for application in a variety of power electronic applications (e.g., electric vehicles (EVs), renewable energy systems, uninterruptible power supplies (UPS), high-voltage direct current (HVDC) transmission, and the like).

Unless otherwise defined, all technical and scientific terms used herein may have the same meaning as commonly understood by one ordinary skilled in the art to which the present disclosure belongs. The system, methods, and examples provided herein may be illustrative only and may not be intended to be limiting.

While specific language has been used to describe the present subject matter, any limitations arising on account thereto, are not intended. As may be apparent to a person skilled in the art, various working modifications may be made to the method to implement the present disclosure as taught herein. The drawings and the forgoing description give examples of embodiments. Those skilled in the art may appreciate that one or more of the described elements may well be combined into a single functional element. Alternatively, certain elements may be split into multiple functional elements. Elements from one embodiment may be added to another embodiment.

The embodiments disclosed herein may be implemented using at least one hardware device and performing network management functions to control the elements.

The foregoing description of the specific embodiments may so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art may recognize that the embodiments herein may be practiced with modification within the scope of the embodiments as described herein.

What is claimed is:

1. A method for operating multiple output switching converters, the method comprising:

determining, by a pulse width modulation (PWM) duty split controller, a plurality of balanced reference signals comprising a first balanced reference signal and a second balanced reference signal;

generating, by the PWM duty split controller, based on the plurality of balanced reference signals, a third balanced reference signal, the generating of the third balanced reference signal comprising limiting, using a limiter of the PWM duty split controller, the first balanced reference signal and the second balanced reference signal and accumulating the limited first balanced reference signal and the limited second balanced reference signal, using an accumulator of the PWM duty split controller; and operating, by the PWM duty split controller, a first switch and a plurality of output switches associated with the multiple output switching converters, based on the plurality of balanced reference signals, the third balanced reference signal, and one or more circuit parameters, wherein the plurality of output switches comprises a second switch and a third switch, and wherein the operating of the first switch and the plurality of output switches comprises:

determining whether a value of an inductor current is lower than a value of the third balanced reference signal;

turning on the first switch, based on determining that the value of the inductor current is lower than the value of the third balanced reference signal, wherein a value of a clock signal is equal to one; and turning off the first switch, and turning on the plurality of output switches based on determining that the value of the inductor current is greater than or equal to the value of the third balanced reference signal.

2. The method of claim 1, further comprising:

determining the first balanced reference signal using a first operational amplifier and a first compensator; and determining the second balanced reference signal using a second operational amplifier and a second compensator.

3. The method of claim 1, wherein the one or more circuit parameters comprise at least one of an inductor current sense voltage, the inductor current, the clock signal, an input voltage, a first signal, a second signal, and a third signal.

4. The method of claim 1, wherein the operating of the first switch and the plurality of output switches comprises:

determining whether the value of the inductor current is lower than a value of the second balanced reference signal;

turning on the second switch for an energy distribution phase at a first output, based on the determining that the value of the inductor current is greater than or equal to the value of the second balanced reference signal; and turning off the second switch at the first output, based on the determining that the value of the inductor current is lower than the value of the second balanced reference signal.

5. The method of claim 4, further comprising:

determining whether the value of the clock signal is equal to one;

turning on the third switch at a second output, based on the determining that the value of the clock signal is not equal to one; and turning off the third switch at the second output, based on the determining that the value of the clock signal is equal to one.

6. The method of claim 3, further comprising:

generating, using a first SR flip-flop and a first comparator, the first signal, based on the clock signal, an inductor current sense voltage signal, and the third balanced reference signal.

7. The method of claim 6, wherein the generating of the first signal comprises:

determining the first signal based on an output of the first SR flip-flop, wherein a set input of the first SR flip-flop is coupled with the clock signal, wherein a reset input of the first SR flip-flop is coupled with an output of the first comparator, wherein a non-inverting input of the first comparator is coupled with the inductor current sense voltage signal, and wherein an inverting input of the first comparator is coupled with the third balanced reference signal.

8. The method of claim 3, further comprising:

generating, using a second SR flip-flop, an OR gate, and a second comparator, the second signal, based on an invert output signal of a first SR flip-flop, the clock signal, an inductor current sense voltage signal, and the second balanced reference signal.

9. The method of claim 8, wherein the generating of the second signal comprises:

generating an output signal of the OR gate based on an output signal of the second comparator and the clock signal; and determining the second signal based on an output of the second SR flip-flop, wherein a set input of the second SR flip-flop is coupled with the invert output signal of the first SR flip-flop, wherein a reset input of the second SR flip-flop is coupled with the output signal of the OR gate, wherein a non-inverting input of the second comparator is coupled with the second balanced reference signal, and wherein an inverting input of the second comparator is coupled with the inductor current sense voltage signal.

10. The method of claim 3, further comprising:

generating, using a third SR flip-flop and a NOR gate, the third signal, based on the first signal, the second signal, and the clock signal.

11. The method of claim 10, wherein the generating of the third signal comprises:

generating an output signal of the NOR gate based on the first signal and the second signal; and determining the third signal based on an output of the third SR flip-flop, wherein a set input of the third SR flip-flop is coupled with the output signal of the NOR gate, wherein a reset input of the third SR flip-flop is coupled with the clock signal, wherein a first input of the NOR gate is coupled with the first signal, and wherein a second input of the NOR gate is coupled with the second signal.

12. A system for operating multiple output switching converters, the system comprising a pulse width modulation (PWM) duty split controller configured to:

determine a plurality of balanced reference signals comprising a first balanced reference signal and a second balanced reference signal;

limit, using a limiter of the PWM duty split controller, the plurality of balanced reference signals;

accumulate, using an accumulator of the PWM duty split controller, the plurality of limited balanced reference signals;

generate, based on the accumulated plurality of limited balanced reference signals, a third balanced reference signal; and operate a first switch and a plurality of output switches associated with the multiple output switching converters, based on the plurality of balanced reference signals, the third balanced reference signal, and one or more circuit parameters, wherein the plurality of output switches comprises a second switch and a third switch, and wherein the PWM duty split controller is further configured to:

determine whether a value of an inductor current is lower than a value of the third balanced reference signal;

turn on the first switch based on a determination that the value of the inductor current is lower than the value of the third balanced reference signal, wherein a value of a clock signal is equal to one; and turn off the first switch and turn on the plurality of output switches based on a determination that the value of the inductor current is greater than or equal to the value of the third balanced reference signal.

13. The system of claim 12, wherein the PWM duty split controller is further configured to:

determine the first balanced reference signal using a first operational amplifier and a first compensator; and determine the second balanced reference signal using a second operational amplifier and a second compensator.

14. The system of claim 12, wherein the one or more circuit parameters comprise at least one of an inductor current sense voltage, the inductor current, the clock signal, an input voltage, a first signal, a second signal, and a third signal.

15. The system of claim 12, wherein the PWM duty split controller is further configured to:

determine whether the value of the inductor current is lower than a value of the second balanced reference signal;

turn on the second switch at a first output based on a determination that the value of the inductor current is greater than or equal to the value of the second balanced reference signal; and turn off the second switch at the first output based on a determination that the value of the inductor current is lower than the value of the second balanced reference signal.

16. The system of claim 15, wherein the PWM duty split controller is further configured to:

determine whether the value of the clock signal is equal to one;

turn on the third switch at a second output based on a determination that the value of the clock signal is not equal to one; and turn off the third switch at the second output based on a determination that the value of the clock signal is equal to one.

17. The system of claim 14, wherein the PWM duty split controller is further configured to:

generate, using a first SR flip-flop and a first comparator, the first signal, based on the clock signal, an inductor current sense voltage signal, and the third balanced reference signal.

18. The system of claim 17, wherein the PWM duty split controller is further configured to:

determine the first signal based on an output of the first SR flip-flop, wherein a set input of the first SR flip-flop is coupled with the clock signal, wherein a reset input of the first SR flip-flop is coupled with an output of the first comparator, wherein a non-inverting input of the first comparator is coupled with the inductor current sense voltage signal, and wherein an inverting input of the first comparator is coupled with the third balanced reference signal.

* * * * *